United States Patent Office

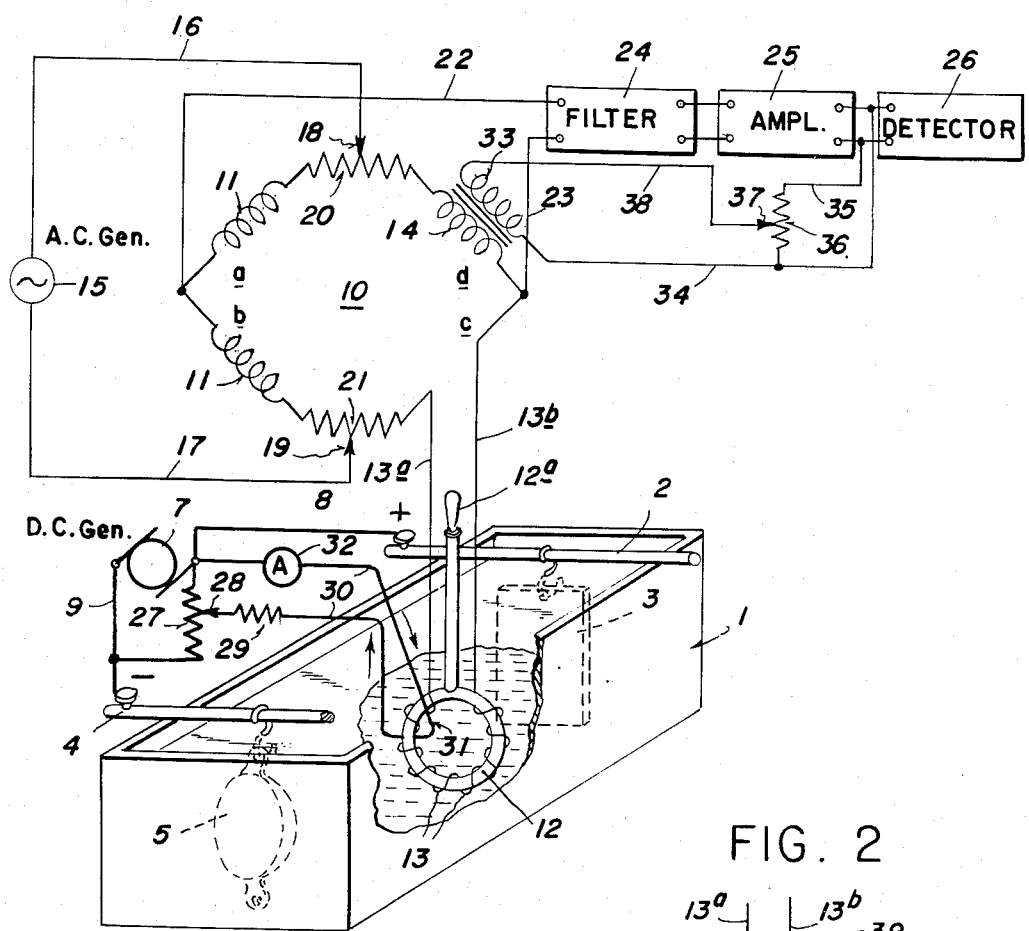

2,749,509
Patented June 5, 1956

2,749,509

MEANS FOR MEASURING THE DENSITY OF DIRECT CURRENT

Lewis A. Medlar, Oreland, Pa., assignor to Fox Products Company, Philadelphia, Pa., a corporation of Pennsylvania Application December 11, 1951, Serial No. 260,975

2 Claims. (Cl. 324—59)

This invention relates to means for measuring the density of the current flowing through a bath of conducting liquid, and more particularly for measuring the current density at any desired point in such a bath.

The invention may be considered as in the nature of a further development of and improvement on the apparatus disclosed in application Ser. No. 260,369, filed December 7, 1951, by Gerard Rezek.

In said application, there is disclosed a method of and means for measuring the density of a direct or uniform current in a bath of conducting liquid, the method being based on the change in the reactance of a coil immersed in such liquid by reason of the magnetic flux set up in the core thereof due to the direct current flowing in the bath through the area enclosed by the coil.

In order for this method to have the desired sensitivity, it is necessary to employ for the core a so-called "high quality" iron, i. e., a special alloy which becomes saturated at a very low level of ampere turns, but such an alloy must be carefully handled and has certain practical disadvantages. One object of the present invention is, therefore, to provide an improved arrangement which will permit of the use of "low quality" irons, while maintaining the desired sensitivity.

It has also been found that the accuracy of the Rezek apparatus, employing the "high quality" alloy, is substantially affected by external or stray direct magnetic fields, even the magnetism of the earth being sufficient to cause different readings when the coil is placed in different angular positions. Another object of the present invention is therefore to devise means for rendering the apparatus immune to the influence of external fields.

With the above objects in view, the invention consists in the arrangement and combination of parts hereinafter described and claimed, and illustrated in the accompanying drawings, forming part of this specification, and in which:

Fig. 1 is a complete diagram showing the electrical circuits employed; and

Fig. 2 is a diagrammatic view showing my improved form of exploring device.

Referring to the drawing in detail, and more particularly first to Fig. 1, a conventional plating vat is indicated at 1, having the usual anode and cathode bars 2 and 4 from which are suspended the anode plate 3 and the article 5 to be plated, respectively.

A direct current generator is indicated at 7 and this is connected with the anode and cathode bars by means of conductors 8 and 9.

10 designates a Wheatstone bridge having suitable impedances 11 in two of the arms *a* and *b* thereof. In the arm *c* is connected a helical coil 13 of insulated wire wound upon a ring-like core 12 of magnetic material.

In the fourth arm *d* of the bridge is an inductance 14 which constitutes the primary winding of a transformer, the secondary of which will be hereinafter described.

While the impedances 11 may be in the nature of pure resistances, it is preferable that they be in the nature of inductances, since inductances are included in the other two arms. By thus employing inductances in all four arms, any substantial phase shift in the output voltage of the bridge, such as might result from using resistances in some of the arms and inductances in others, is avoided.

An alternating current generator 15 of fairly high frequency is connected to two opposite corners of the bridge by means of wires 16 and 17, having at their ends slides 18 and 19 movable over resistances 20 and 21, by means of which suitable adjustments may be made.

To the opposite corners of the bridge are connected wires 22 and 23 which deliver the output of the bridge to a filter 24 and thence to an amplifier 25 and detector 26. This detector may be of any suitable kind but is preferably of the type known as the "magic eye," which is extremely sensitive.

It will be noted that alternating current from the generator 15 flows from the slide 18 through the inductance 14 and winding 13 in series and back through the slide 19.

The parts are so chosen and adjusted that the reactance of the inductance 14, which may be referred to as a standard inductance, is equal to the maximum reactance of the coil 13 wound on the core 12, so that the bridge is normally balanced and the detector 26 indicates that the output of the bridge is zero.

When, however, the exploring coil 13 and core 12 are immersed in the plating bath in such a position that current flowing in the bath passes through the opening of the core 12, as indicated by the dotted arrows, this current sets up a magnetic flux in the core 12, and the presence of this flux reduces the reactance of the coil 13 so that the bridge is no longer balanced.

In order to again balance the bridge, and determine the value of the current flowing in the bath through the area of the ring-like core, I provide a shunt circuit around the terminals of the direct current generator 7, such circuit including a resistance 27. I also provide an auxiliary circuit comprising a slide 28 adjustable along the resistance 27, a conductor 30, and a resistance 29, the conductor 30 being looped through the core 12, as indicated at 31, and containing a current measuring instrument 32 in the nature of an ammeter. It will be particularly noted that, as indicated by the arrows, the current flows through this loop where it passes around the ring 12 in a direction opposite to that in which the current flows through the bath. Thus, the current in this auxiliary circuit tends to generate in the core 12 a flux which opposes the flux set up by the current flowing in the bath through the area enclosed by the ring.

In making my measurements, I adjust the slide 28 until the current in the auxiliary circuit is just sufficient to completely neutralize the flux in the core 12. When this occurs, the reactance of the coil 13 is increased to a maximum, at which value it is again equal to that of the standard inductance 14, and the bridge is again balanced, as indicated by the detector 26. When such balancing occurs, the value of the current flowing in the auxiliary circuit, as shown by the meter 32, indicates the density of the current flowing in the bath at the point where the core 12 and coil 13 are immersed. In other words, it is clear that when the flux in the core 12 is completely neutralized, the current in the auxiliary circuit must be equal to the current flowing in the bath through the area enclosed by the ring. The meter 32 may be calibrated to read current density directly as, for example, amperes per square unit of cross-sectional area.

In referring to "the area enclosed by the ring", as in the preceding paragraph, it was assumed that, as indicated in the drawing, the core is so positioned that its plane lies at substantial right angles to the direction of current flow through the bath. But this right angled relationship, while preferable, is by no means essential. All that is necessary is that the core be placed in such angular position that the current flowing in the bath passes through the opening thereof. When the core is placed at right angles to the direction of current flow, the entire area enclosed is the effective area used in determining the current density in the bath. If, however, the core is so placed that its plane lies at some angle less than a right angle, to the direction of current flow, then the effective area is the projection of the actual area on a plane lying at right angles to the direction of current flow, and this projected, effective area is proportional to the cosine of the angle which the core makes with such plane. Thus the effective area may be readily computed, or a meter calibrated, for any given angular position of the core. Where, therefore, in the specification and claims, reference is made to the "area" of the core, or the "area enclosed" thereby, the effective area, as above defined, is intended.

In order to increase the sensitivity of the apparatus, when using a core of so-called "low quality" iron, which does not become completely saturated at a low level of ampere turns, as described in the above identified application of Gerard Rezek, I associate with the inductance 14, constituting the secondary winding of a transformer, a primary winding 33, connected by wires 34 and 35 with the output of the amplifier 25. The wire 35 contains a shunt resistance 36 over which works a slide 37, after the manner of a potentiometer, this slide being connected by wire 38 with the other end of the secondary winding 33.

By this arrangement I am enabled to feed back current from the amplifier to the bridge through the secondary 33 of the transformer, and by adjusting the slide 37 the amount of this feed back can be regulated as desired.

The current thus fed back into the transformer from the amplifier will, if in proper phase relationship, induce in the primary 14 a voltage which aids the voltage of self-induction in this primary winding, due to the bridge current from the generator 15. Thus, a larger voltage drop appears across this inductance, and this has the same effect as a lower voltage drop across the coil 13. It will therefore be seen that, by this arrangement, the slight unbalance due to the small reduction of the reactance of the coil 13, by reason of the bath current, is increased by the corresponding increase in the voltage drop of the inductance 14. In practice, it is desirable to adjust the amount of the feed back to an extent just short of the point where the bridge would be permanently locked in an unbalanced condition. This gives the maximum sensitivity.

It will be understood that the relative direction of winding of coils 33 and 14 and the relative phases of voltages there-across are such that the voltage fed back from amplifier 25 increases the voltage across coil 14.

In order to maintain a proper phase relationship between the output and feed back voltages, as above mentioned, that is to say, either in phase or 180° out of phase, it is important that the amplifier be so constructed that it will not cause any substantial phase shift during amplification. Thus both the bridge and the amplifier should be so designed as to avoid phase shift.

By the use of the above described feed back, I am enabled to obtain, with a core made of low quality iron, some of the same characteristics as are obtained from the high quality iron, without the feed back.

As described in the above mentioned application of Gerard Rezek, the system as illustrated is insensitive to external alternating current fields but is, on the other hand, easily influenced by external uni-directional fields. Even the earth's magnetism is sufficient to cause substantially different readings when the exploring coil is placed in different angular positions.

I have found that the exploring device may be rendered immune to the effect of external magnetic fields by employing the arrangement illustrated in Fig. 2. In this arrangement, instead of a single core and coil, I employ two ring-like cores 12 and 12' placed coaxially close together in parallel planes, each core having a helical coil wound thereon as indicated at 13 and 13'. It will be particularly noted that these coils must be wound in opposite directions on the two cores, and as shown, the two windings are connected in series with each other at the point 37. Thus, current comes in, say, through lead 13ᵃ, passes in series through the two coils 13 and 13' in opposite directions, and leaves by conductor 13ᵇ. Thus, when the current from the generator 15 passes in series through these two windings, the alternating current flux set up in one ring-like core at any given instant, is in the opposite direction from the alternating current flux in the other core.

The theory of operation of this arrangement is not definitely known, but it has been found from experiment that an exploring device composed of a pair of cores and coils, as above described, is substantially free from the influence of external magnetic fields.

It will of course be understood that the pair of cores and coils illustrated in Fig. 2 are rigidly connected mechanically and are substituted for the single core and coil shown in Fig. 1. The auxiliary circuit comprising the conductor 30 is looped through both rings as clearly shown in Fig. 2. The reactance of the pair of coils, is, of course, a maximum when no current is flowing in the bath, and, as in Fig. 1, this maximum value is equal to the reactance of the standard coil 14, and is shown by the detector 26, which, under these circumstances, indicates that the output of the bridge is zero.

It will be understood that the exploring device comprising the core or cores 12 and 12' and the coil or coils 13 and 13' are preferably provided with a handle 12ᵃ by which they may be manipulated, and the entire apparatus may conveniently be mounted in a box containing the meters and controls and connected with the handle 12ᵃ by means of a flexible cable, the same as illustrated and described in the application S. N. 255,233, filed November 17, 1951, by Gerard Rezek.

While I have shown in Fig. 1 by way of example an arrangement of coil and of auxiliary and shunt circuits similar to that illustrated in Fig. 1 of the above identified application of Gerard Rezek, S. N. 260,369, it will be understood that the present invention is by no means limited to this, but is equally applicable to other circuit arrangements, such, for example, as the series resistor or meter shunt arrangement illustrated in Fig. 3 of said Rezek application.

Where, in the appended claims, I describe the core as "ring-like," this is intended to include forms other than a true ring, as, for example, an ellipse or any regular or irregular polygon as explained in co-pending application Ser. No. 252,742, filed October 23, 1951, by Godshalk, Keck, and myself, now abandoned and superseded by continuation-in-part application Ser. No. 407,418, filed February 1, 1954.

While I have shown and described the current through the bath as a uniform, direct current, it may also be uni-directional pulsating current, such as that derived from a rectifier fed with alternating current. If, in this case, the auxiliary circuit is supplied from the same source, as by means of a shunt resistor in series with the anode or cathode bars, as above mentioned, then the balancing current in the auxiliary circuit will be of exactly the same character as the bath current, and hence the bridge may be balanced in the manner above described.

Where, in the appended claims, I use the phrase "direct current," I intend it to include a uni-directional pulsating current as well as a uniform current.

What I claim is:

1. Apparatus for comparing the reactance of a variable inductance with that of a standard inductance comprising a bridge circuit having the inductances in different arms thereof, a source of periodic current connected across the input of said bridge, indicating means connected across the output of said bridge, a coil wound in inductive relation with the standard inductance, and means connecting said coil and said indicating means to provide voltage across the coil proportional to the voltage supplied the indicating means, said coil and standard inductance being relatively so wound and the voltages across the coil and standard inductance being of such relative phases that the voltage induced in the standard inductance by reason of current flowing through the coil aids the voltage across the standard inductance caused by current flowing from said source of periodic current.

2. Apparatus as defined in claim 1 in which the standard and variable inductances are so positioned in the bridge circuit that the current from said source of periodic current flows through said inductances in series.

References Cited in the file of this patent

UNITED STATES PATENTS

| | | |
|---|---|---|
| 1,496,786 | Shackelton | June 10, 1924 |
| 1,695,424 | Harrison | Dec. 18, 1928 |
| 1,825,514 | Fitzgerald | Sept. 29, 1931 |
| 1,965,439 | Stoller | July 3, 1934 |
| 2,365,706 | Keinath | Dec. 26, 1944 |

FOREIGN PATENTS

| | | |
|---|---|---|
| 58,565 | Holland | Dec. 16, 1946 |